(12) United States Patent
Takahashi et al.

(10) Patent No.: US 8,800,388 B2
(45) Date of Patent: Aug. 12, 2014

(54) TORQUE SENSOR APPARATUS

(71) Applicants: Denso Corporation, Kariya (JP); Nippon Soken, Inc., Aichi (JP)

(72) Inventors: Yoshiki Takahashi, Okazaki (JP); Shigetoshi Fukaya, Toyota (JP); Osamu Shimomura, Okazaki (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 0 days.

(21) Appl. No.: 13/716,789

(22) Filed: Dec. 17, 2012

(65) Prior Publication Data

US 2013/0152702 A1    Jun. 20, 2013

(30) Foreign Application Priority Data

Dec. 16, 2011    (JP) .................................. 2011-276008

(51) Int. Cl.
*G01L 3/00* (2006.01)

(52) U.S. Cl.
USPC ..................................................... 73/862.331

(58) Field of Classification Search
USPC ................. 73/862.331–862.338, 862.325
See application file for complete search history.

(56) References Cited

U.S. PATENT DOCUMENTS

| | | | |
|---|---|---|---|
| 7,110,902 B2 * | 9/2006 | Fukaya et al. ..................... 702/99 |
| 7,246,531 B2 * | 7/2007 | Nakane et al. ............ 73/862.332 |
| 7,415,898 B2 * | 8/2008 | Ishihara et al. .......... 73/862.331 |
| 7,568,400 B2 * | 8/2009 | Tokumoto et al. ....... 73/862.333 |
| 7,798,019 B2 * | 9/2010 | Osuka et al. ............. 73/862.331 |
| 7,845,244 B2 * | 12/2010 | Aoki et al. ............... 73/862.335 |
| 8,015,885 B2 * | 9/2011 | Arita et al. ............... 73/862.333 |
| 2006/0021451 A1 | 2/2006 | Ishihara et al. |
| 2007/0240521 A1 | 10/2007 | Osuka et al. |
| 2009/0078058 A1 | 3/2009 | Aoki et al. |
| 2013/0312539 A1 * | 11/2013 | Shimomura et al. ..... 73/862.325 |

FOREIGN PATENT DOCUMENTS

| | | |
|---|---|---|
| JP | 2008-232728 | 10/2008 |
| JP | 2011-232318 | 11/2011 |

OTHER PUBLICATIONS

Office Action (1 page) dated Oct. 31, 2013, issued in corresponding Japanese Application No. 2011-276008 and English translation (2 pages).
Office Action (1 page) dated Jan. 14, 2014, issued in corresponding Japanese Application No. 2011-276008 and English translation (1 page).
Office Action issued in corresponding Korean Application 10-2012-146031 on Jan. 29, 2014 with English-language translation.

* cited by examiner

*Primary Examiner* — Lisa Caputo
*Assistant Examiner* — Octavia D. Hollington
(74) *Attorney, Agent, or Firm* — Nixon & Vanderhye, P.C.

(57) ABSTRACT

A torsion bar has first and second end portions that are fixed to input and output shafts, respectively, to coaxially connect between the input and output shafts. A multipolar magnet is fixed to the input shaft. First and second magnetic yokes are fixed to the output shaft. Magnetic sensors are held between magnetic flux collecting portions of first and second magnetic flux collecting rings, which are magnetically coupled to the first and second magnetic yokes, respectively. In each of the magnetic flux collecting portion, a connecting section and a mounting section are configured such that a width of the connecting section is smaller than a width of the mounting section.

7 Claims, 12 Drawing Sheets

TORQUE SENSOR APPARATUS

CROSS REFERENCE TO RELATED APPLICATION

This application is based on and incorporates herein by reference Japanese Patent Application No. 2011-276008 filed on Dec. 16, 2011.

TECHNICAL FIELD

The present disclosure relates to a torque sensor apparatus.

BACKGROUND

It is known to provide a torque sensor apparatus in, for example, an electric power steering unit. The torque sensor apparatus senses a change in the strength of a magnetic field, which is caused by rotation of a rotatable shaft, with a magnetic sensor(s) to sense a shaft torque applied to the rotatable shaft. The magnetic sensor(s) is held between two magnetic flux collecting bodies. Particularly, in a case where the magnetic sensor(s) is held between two magnetic flux collecting portions of the magnetic flux collecting bodies, in which the magnetoresistance is relatively low, the magnetic flux is concentrated in the magnetic flux collecting portions. The magnetic flux, which is collected in one of the magnetic flux collecting portions, is conducted from the one of the magnetic flux collecting portions to the other one of the magnetic flux collecting portions, and this magnetic flux is sensed with the magnetic sensor(s).

For example, JP2007-263871A (US2007/0240521A1) teaches a structure that includes two magnetic flux collecting portions (magnetism collecting portions), which correspond to two magnetic sensors, respectively, and are formed in a magnetic flux collecting ring (magnetic flux collecting body). Alternatively, JP2008-232728A and JP2009-080020A (US2009/0078058A1) teach a structure that includes three magnetic flux collecting portions, which correspond to three magnetic sensors, respectively, and are formed in a magnetic flux collecting ring. Further alternatively, JP2006-38767A (US2006/0021451A1) teaches a structure that includes a rectangular magnetic flux collecting portion, which radially outwardly projects from a magnetic flux connecting ring, and two magnetic sensors are arranged adjacent to each other in the magnetic flux collecting portion.

The magnetic flux, which is collected in the magnetic flux collecting portion, is conducted not only to the magnetic sensor. Specifically, the magnetic flux, which is collected in the magnetic flux collecting portion, is also released into the surrounding space, which surrounds the magnetic flux collecting portion. For example, in the structure of JP2007-263871A (US2007/0240521A1), a portion of the magnetic flux, which is collected by the magnetic flux collecting ring, is released into the space located between the two magnetic flux collecting portions. The magnetic flux, which is released into the space, becomes a leaked magnetic flux that is not conducted to the magnetic sensor. Thereby, the amount of the magnetic flux, which can be effectively sensed with the magnetic sensor, is reduced by the amount of the leaked magnetic flux. Furthermore, in the structure of JP2008-232728A and JP2009-080020A (US2009/0078058A1), the number of the spaces defined among the magnetic flux collecting portions, is two. Therefore, the amount of the leaked magnetic flux is further increased.

In contrast, in the structure of JP2006-38767A (US2006/0021451A1), the two magnetic sensors are placed adjacent to each other in the single magnetic flux collecting portion. Therefore, the leakage of the magnetic flux into the space adjacent to the magnetic flux collecting portion can be reduced. However, the magnetic flux is also released into the surrounding space from a connecting section, which connects between the magnetic flux collecting ring and the sensor mounting section, so that the released magnetic flux becomes the leaked magnetic flux. In the structure of JP2006-38767A (US2006/0021451A1), the rectangular magnetic flux collecting portion has a relatively wide connecting section, which corresponds to the two magnetic sensors. Therefore, the amount of the leaked magnetic flux, which leaks from this connecting section to the surrounding space, is increased. Furthermore, in the case where the rectangular magnetic flux collecting portion is formed integrally into the magnetic flux collecting ring, the formation of the magnetic flux collecting ring into a circular form becomes difficult.

SUMMARY

The present disclosure is made in view of the above points.

According to the present disclosure, there is provided a torque sensor apparatus, which includes first and second shafts, a torsion bar, a multipolar magnet, first and second magnetic yokes, first and second magnetic flux collecting bodies and a magnetic sensor. The torsion bar has first and second end portions. The first and second end portions are fixed to the first and second shafts, respectively, to coaxially connect between the first and second shafts, and the torsion bar is torsionally deformable when a torque is exerted between the first and second shafts. The multipolar magnet is fixed to one of the first shaft and the first end portion of the torsion bar. The first and second magnetic yokes are located on a radially outer side of the multipolar magnet and are fixed to one of the second shaft and the second end portion of the torsion bar. The first and second magnetic yokes are opposed to each other in an axial direction of the torsion bar such that a gap is interposed between the first and second magnetic yokes in the axial direction, and the first and second magnetic yokes form a magnetic circuit in a magnetic field generated from the multipolar magnet. The first and second magnetic flux collecting bodies are formed separately from the first and second magnetic yokes. Each of the first and second magnetic flux collecting bodies includes a main body portion and a magnetic flux collecting portion. The main body portion is placed adjacent to a corresponding one of the first and second magnetic yokes. The magnetic flux collecting portion radially outwardly projects from the main body portion and is magnetically coupled with a corresponding one of the first and second magnetic yokes through the main body portion to conduct a magnetic flux between the corresponding one of the first and second magnetic yokes and the magnetic flux collecting portion. The magnetic sensor is held between the magnetic flux collecting portions of the first and second magnetic flux collecting bodies and includes a magnetic sensing device, which senses a strength of a magnetic field generated between the magnetic flux collecting portions of the first and second magnetic flux collecting bodies. The magnetic flux collecting portion of each of the first and second magnetic flux collecting bodies includes a mounting section and a connecting section. The magnetic sensor is installed to this mounting section. The connecting section extends from the main body portion of the magnetic flux collecting body in a first direction in an imaginary plane, which is perpendicular to an axis of the torsion bar, to join between the main body portion and the mounting section. The connecting section and the mounting section of each of the first and second magnetic flux collecting bodies are configured such that a width of the connecting section, which is measured in a second direction that is perpendicular to the first direction in the imaginary plane, is smaller than a width of the mounting section measured in the second direction.

BRIEF DESCRIPTION OF THE DRAWINGS

The drawings described herein are for illustration purposes only and are not intended to limit the scope of the present disclosure in any way.

DETAILED DESCRIPTION

Various embodiments of the present disclosure will be described with reference to the accompanying drawings.

First Embodiment

Figure 2:
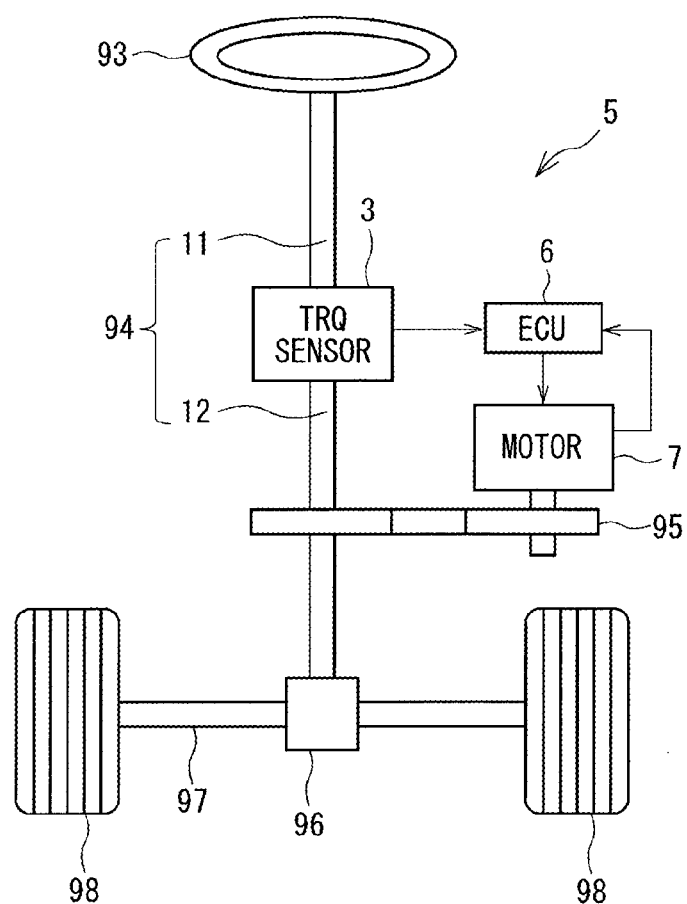
FIG. 2 is a schematic diagram showing an electric power steering unit, in which the torque sensor apparatus of the first embodiment is applied.

With reference to FIG. 2, a torque sensor apparatus 3 of a first embodiment of the present disclosure is applied to an electric power steering unit, which assists a steering operation of a vehicle.

FIG. 2 is a schematic diagram showing an entire structure of a steering system, which includes the electric power steering unit 5. A torque sensor apparatus 3, which senses a steering torque, is provided at a steering shaft 94 that is connected to a handle (a steering wheel) 93. A pinion gear 96 is provided at a distal end portion of the steering shaft 94 and is meshed with a rack shaft 97. Two drive wheels 98 are rotatably connected to two opposed end portions, respectively, of the rack shaft 97 through, for example, a tie rod. Rotational motion of the steering shaft 94 is converted into linear motion of the rack shaft 97 through the pinion gear 96 to steer the wheels 98.

The torque sensor apparatus 3 is placed between an input shaft 11 and an output shaft 12 of the steering shaft 94. The torque sensor apparatus 3 senses the steering torque, which is exerted to the steering shaft 94, and the torque sensor apparatus 3 outputs the sensed steering torque to an electronic control unit (ECU) 6. The ECU 6 controls an output of an electric motor 7 based on the sensed steering torque. A steering assist torque, which is generated by the electric motor 7, is conducted to a speed reducing gear assembly 95. A rotational speed of the rotation, which is outputted from the electric motor 7, is reduced through the speed reducing gear assembly 95 and is then transmitted to the steering shaft 94.

Next, a structure of the torque sensor apparatus 3 will be described with reference to FIGS. 1 and 3A-5B.

Figure 1:
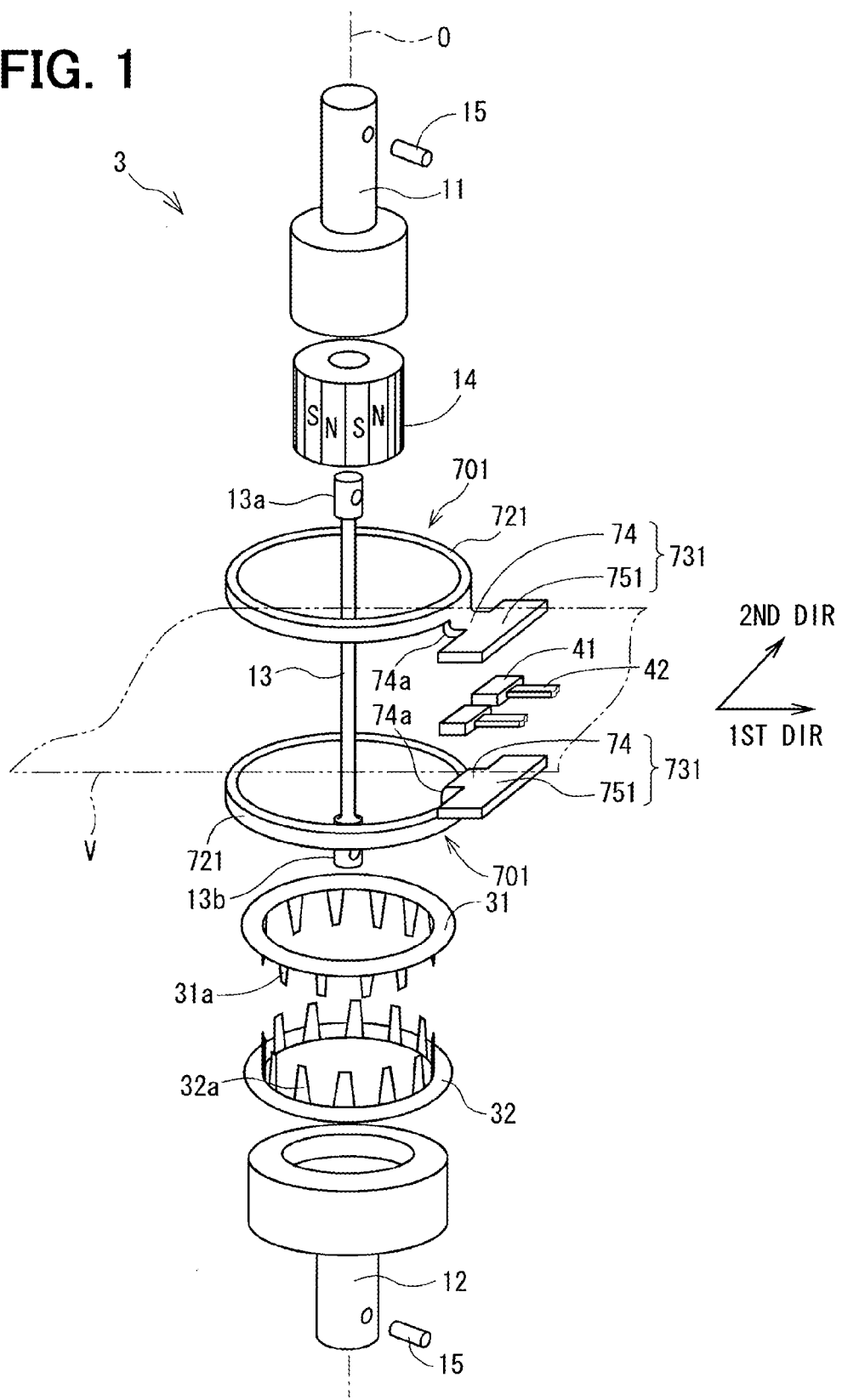
FIG. 1 is an exploded perspective view of a torque sensor apparatus according to a first embodiment of the present disclosure.

As shown in FIG. 1, the torque sensor apparatus 3 includes a torsion bar 13, a multipolar magnet 14, two magnetic yokes (serving as first and second magnetic yokes) 31, 32, two magnetic flux collecting rings (serving as first and second magnetic flux collecting bodies) 701 and two magnetic sensors 41. In this instance, the magnetic sensors 41 are generally identical to each other, and each of the magnetic sensors 41 may be formed as, for instance, a Hall IC sensor or a magnetoresistive (MR) sensor.

One end portion (first end portion) 13a of the torsion bar 13 is fixed to the input shaft (serving as a first shaft) 11 through a fixation pin 15, and the other end portion (second end portion) 13b of the torsion bar 13, which is opposite from the one end portion 13a of the torsion bar 13 in the axial direction, is fixed to the output shaft (serving as a second shaft) 12 through a fixation pin 15. Therefore, the torsion bar 13 coaxially connects between the input shaft 11 and the output shaft 12 along a rotational axis O. The torsion bar 13 is a resilient member, which is configured into a rod form. The torsion bar 13 converts the steering torque, which is exerted to the steering shaft 94 and is conducted to the torsion bar 13, into torsional displacement (torsional deformation or torsional twist) of the torsion bar 13. Specifically, the torsion bar 13 is torsionally deformable or twistable when the torque is exerted between the input shaft 11 and the output shaft 12 upon operation of the steering wheel 93 connected to the input shaft 11 of the steering shaft 94.

The multipolar magnet 14, which is configured into a cylindrical tubular form, is fixed to the input shaft 11 and is magnetized to have a plurality of N-poles and a plurality of S-poles, which are alternately arranged one after another in the circumferential direction. For instance, in this embodiment, the number of the N-poles is twelve, and the number of the S-poles is also twelve, so that the multipolar magnet 14 has twenty four magnetic poles (see FIGS. 3A to 4B). However, the number of magnetic poles of the multipolar magnet is not limited to twenty four and may be changed to any other appropriate even number.

Each of the magnetic yokes 31, 32 is made of a soft magnetic material and is configured into a ring form. The magnetic yokes 31, 32 are fixed to the output shaft 12 at a location that is radially outward of the multipolar magnet 14. Each of the magnetic yokes 31, 32 has a plurality of claws (teeth) 31a, 32a, which are arranged one after another at generally equal intervals along an inner peripheral edge of a ring portion of the magnetic yoke 31, 32. The number (twelve in this embodiment) of the claws 31a, 32a of each magnetic yoke 31, 32 is the same as the number of the N-poles or the S-poles of the multipolar magnet 14. The claws 31a of the magnetic yoke 31 and the claws 32a of the magnetic yoke 32 are alternately arranged one after another in the circumferential direction while being circumferentially displaced from each other. Thereby, the magnetic yoke 31 is opposed to the magnetic yoke 32 in the axial direction while an air gap is interposed between the magnetic yoke 31 and the magnetic yoke 32 in the axial direction. The magnetic yokes 31, 32 form a magnetic circuit in a magnetic field, which is generated from the multipolar magnet 14.

In the present embodiment, as shown in FIGS. 3A to 4B, the magnetic yokes 31, 32 are integrally molded with molding resin 33 to form a yoke unit 30.

In this instance, the multipolar magnet 14 and the magnetic yokes 31, 32 are arranged such that a circumferential center of each claw 31a, 32a of each magnetic yoke 31, 32 coincides with a boundary between a corresponding one of the N-poles and a corresponding one of the S-poles of the multipolar magnet 14 in a state where the torsional displacement (torsional twist) is not generated in the torsion bar 13, i.e., where the steering torque is not applied between the input shaft 11 and the output shaft 12.

Each of the magnetic flux collecting rings 701 is made of a soft magnetic material and has a main body portion 721 and a magnetic flux collecting portion 731. The magnetic flux collecting rings 701 are arranged such that the main body portions 721 are opposed to each other in the axial direction, and the magnetic flux collecting portions 731 are opposed to each other in the axial direction. In the present embodiment, the main body portion 721 of each magnetic flux collecting ring 701 is configured into an annular form (arcuately curved form), which circumferentially extends all around about the rotational axis O and is located radially outward of the magnetic yokes 31, 32.

The magnetic flux collecting portion 731 radially outwardly projects from the main body portion 721 and has a connecting section 74 and a mounting section 751. The magnetic flux collecting ring 701 collects the magnetic flux into the magnetic flux collecting portion 731.

The magnetic sensors 41 are installed between the mounting sections 751 of the magnetic flux collecting rings 701. In this instance, the mounting sections 751 are generally planar. In each magnetic flux collecting ring 701, the connecting section 74 connects, i.e., joins between the main body portion 721 and the mounting section 751. In the present embodiment, the connecting section 74 of each magnetic flux collecting ring 701 is bent at a bending part 74a to place the mounting section 751 of the magnetic flux collecting ring 701 at a position where each magnetic sensor 41 can be clamped between the opposed mounting sections 751 of the magnetic flux collecting rings 701, which are axially opposed to each other (see FIG. 5B). In other words, the connecting sections 74 of the magnetic flux collecting rings 701 are bent to place the mounting sections 751 such that an axial distance between the opposed axially inner surfaces of the mounting sections 751 measured in the axial direction of the torsion bar 13 is smaller than an axial distance between the opposed axially inner surfaces of the main body portions 721 measured in the axial direction of the torsion bar 13.

Figure 5A:
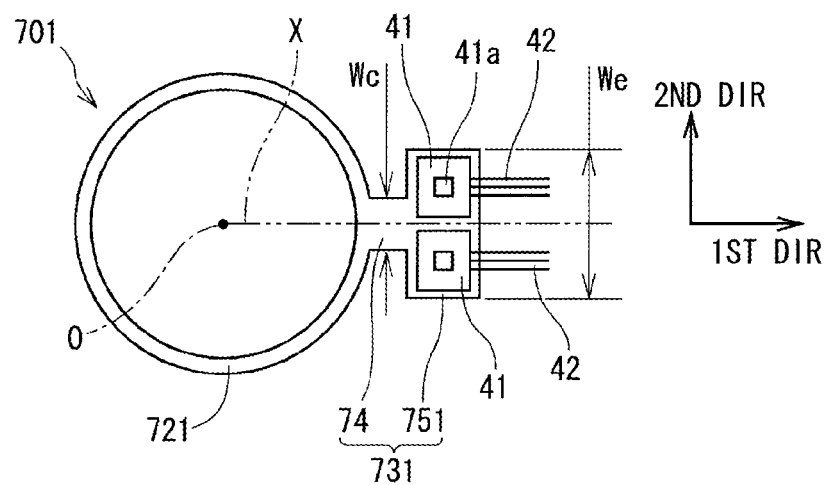
FIG. 5A is a plan view of a magnetic flux collecting ring of the first embodiment.
Figure 5B:
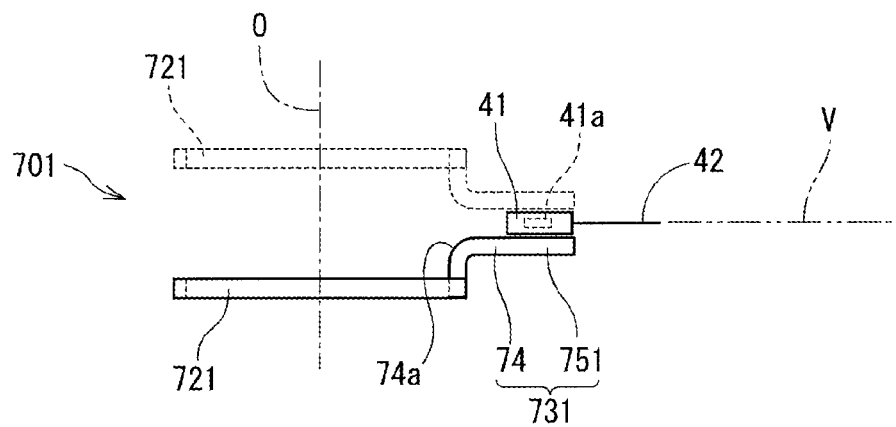
FIG. 5B is a side view of the magnetic flux collecting rings shown in FIG. 5A.

An extending direction (the direction of an imaginary extending line X) of the connecting section 74, which radially outwardly extends from the main body portion 721, will be hereinafter referred to as a first direction (abbreviated as "1ST DIR" in the drawings). Furthermore, a direction, which is perpendicular to the first direction on an imaginary plane V (see FIG. 1) that is perpendicular to the rotational axis O, will be referred to as a second direction (abbreviated as "2ND DIR" in the drawings). In the present embodiment, the first direction is a radial direction of the rotational axis O, i.e., is a normal line of a curve (arcuate curve) of the main body portion 721. The second direction is a direction that is tangent to the curve (arcuate curve) of the main body portion 721. Therefore, a width Wc of the connecting section 74, which is measured in the second direction, is smaller than a width We of the mounting section 751, which is measured in the second direction. Thus, the connecting section 74 is configured into a form of a neck, which has the width that is smaller than the width of the adjacent radially inner part of the magnetic flux collecting ring 701 located adjacent to the neck (i.e., the connecting section 74) and the width of the adjacent radially outer part of the magnetic flux collecting ring 701 located adjacent to the neck (see FIG. 5A). Furthermore, a plate thickness of the mounting section 751 is generally the same as that of the connecting section 74, as shown in FIG. 5B. The plate thickness of the mounting section 751 is measured in a direction perpendicular to a plane of the mounting section 751, which is parallel to the imaginary plane V.

It is desirable that each magnetic sensor 41 is placed as close as possible to the main body portions 721 of the magnetic flux collecting rings 701 to achieve the high sensitivity of the magnetic sensor 41. However, in some cases, it is necessary to avoid an interference(s) of the magnetic sensor 41 with the other component(s) and/or to provide an appropriate space to make an electrical wiring connection to the magnetic sensor 41. Thus, a required minimum distance needs to be provided between the magnetic sensor 41 and the main body portion 721 of each magnetic flux collecting ring 701 by the connecting section 74.

Each magnetic sensor 41 is placed between the mounting sections 751 of the magnetic flux collecting portions 731, and a magnetic sensing device 41a of the magnetic sensor 41 senses a density of a magnetic flux (the strength of the magnetic flux) generated between the magnetic flux collecting portions 731 and converts the sensed density of the magnetic flux into a corresponding voltage signal, which is in turn outputted from the magnetic sensor 41 through a corresponding lead line (electric conductive line) 42. For instance, a Hall element or a magnetoresistive element may be used as the magnetic sensing device 41a of the magnetic sensor 41.

In the present embodiment, the magnetic sensors 41 are placed one after another in the second direction along the mounting sections 751. In the present embodiment, as shown in FIGS. 3A to 4B, the magnetic flux collecting rings 701 and the magnetic sensors 41 are integrated together by the molding resin 43 to form a sensor unit 40. However, the magnetic flux collecting rings 701 and the magnetic sensors 41 may not be molded together with the resin in some cases.

Similar to, for example, the technique of JP2007-263871A (US2007/0240521A1), one of the magnetic sensors 41 may be used to sense the torque applied to the input and output shafts 11, 12. The other one of the magnetic sensors 41 may be used for the failure determination purpose. Specifically, for the failure determination purpose, the outputs of these two magnetic sensors 41 are periodically compared. In a case where a substantial difference exists between the outputs of these magnetic sensors 41, the output of one of these two magnetic sensors 41 may show an abnormal change in comparison to a previous output or a subsequent output of the one of the magnetic sensors 41, and the output of the other one of these magnetic sensors 41 may show a normal change in comparison to a previous output or a subsequent output of the other one of the magnetic sensors 41. Therefore, in such a case, the one of these two magnetic sensors 41, which shows the abnormal change in the output, is determined to be in a failed state, and thereby a required countermeasure may be taken. Alternatively, similar to, the technique of JP2006-38767A (US2006/0021451A1), a sensing direction of one of the magnetic sensors 41 may be set to be opposite from a sensing direction of the other one of the magnetic sensors 41. In such a case, by obtaining a difference between the outputs of these two magnetic sensors 41, it is possible to reduce or eliminate influences of, for example, centrifugal whirling of the multipolar magnet 14 and the magnetic yokes 31, 32, the temperature characteristic variations of the individual magnetic sensor 41 and the axial sensitivity variations of the individual magnetic sensor 41 on the sensed result of the individual magnetic sensor 41. Thereby, it is possible to increase the sensing accuracy of the torque sensor apparatus 3.

Figure 3A:
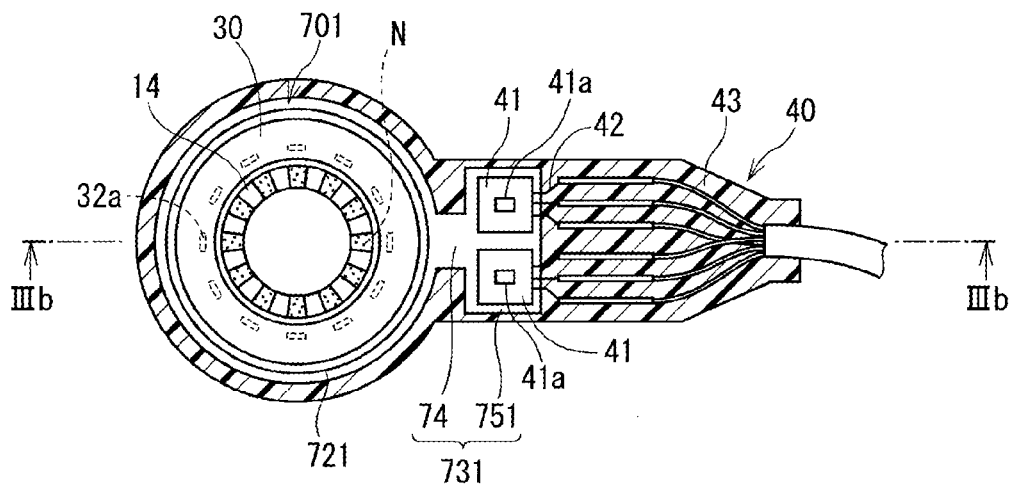
FIG. 3A is a schematic view of the torque sensor apparatus in one operational state for describing an operational principle of the torque sensor apparatus according to the first embodiment.
Figure 3B:
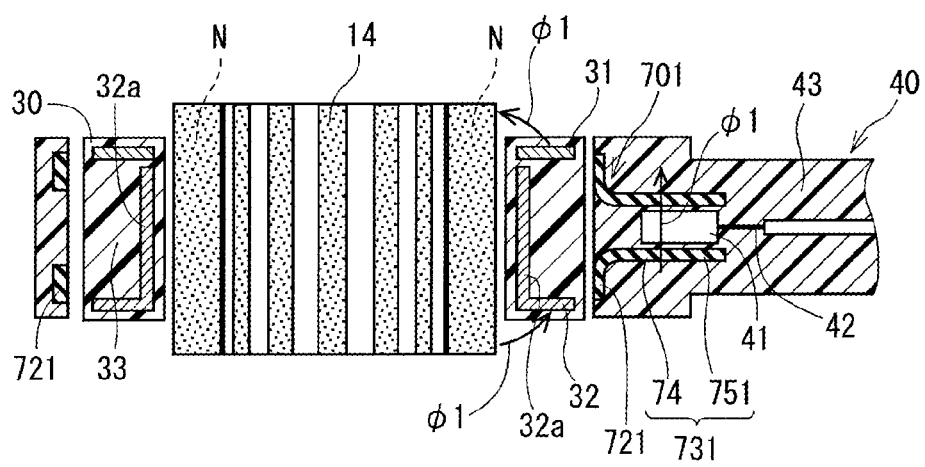
FIG. 3B is a cross-sectional view taken along line IIIB-IIIB in FIG. 3A.
Figure 4A:
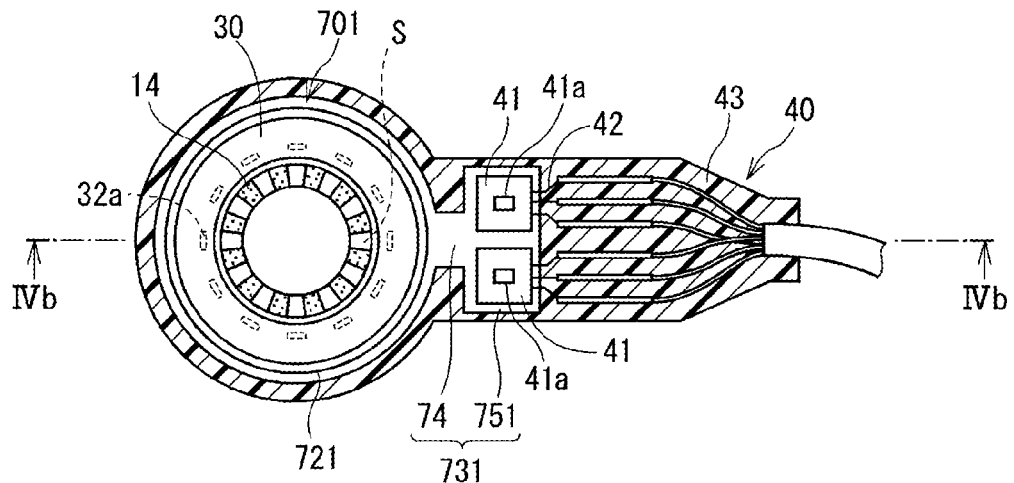
FIG. 4A is a schematic view of the torque sensor apparatus in another operational state for describing the operational principle of the torque sensor apparatus according to the first embodiment.
Figure 4B:
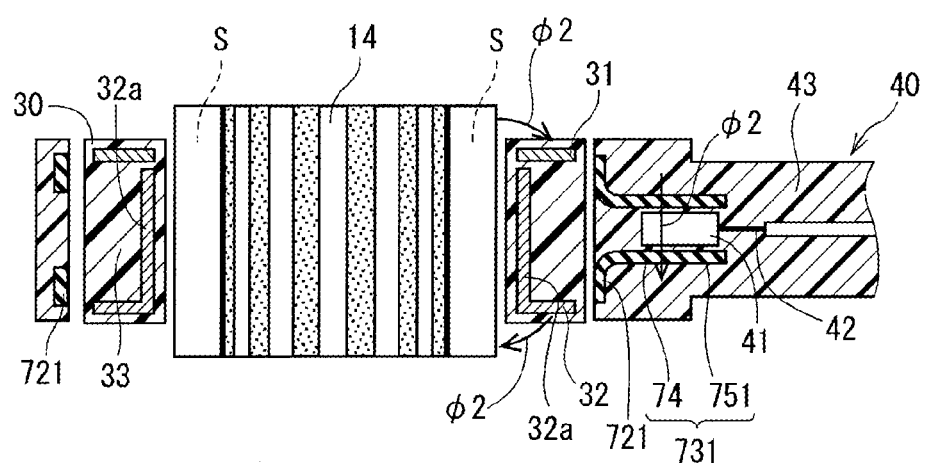
FIG. 4B is a cross-sectional view taken along line IVB-IVB in FIG. 4A.

Next, an operation of the torque sensor apparatus 3 will be described with reference to FIGS. 3A to 4B. FIGS. 3A and 3B show a state, in which the claws 32a of the magnetic yoke 32 are radially opposed to the N-poles, respectively, of the multipolar magnet 14. FIGS. 4A and 4B show another state, in which the claws 32a of the magnetic yoke 32 are radially opposed to the S-poles, respectively, of the multipolar magnet 14.

In FIGS. 3A and 4A, the yoke unit 30 and the multipolar magnet 14 are seen from the top side in FIG. 1 in the axial direction, and the sensor unit 40 is seen as a cross-sectional view taken along the magnetic flux collecting ring 701. Furthermore, in the yoke unit 30, the claws 32a are indicated by dotted lines, and the claws 31a are not depicted for the sake of simplicity.

In a neutral state, in which the steering torque is not applied between the input shaft 11 and the output shaft 12, and thereby the torsional displacement (torsional twist) is not generated in the torsion bar 13, the magnetic yokes 31, 32 are held in an intermediate state, which is circumferentially centered between the state of FIGS. 3A and 3B and the state of FIGS. 4A and 4B. That is, the circumferential center of each of the claws 32a of the magnetic yoke 32 coincides with the boundary between the corresponding N-pole and the corresponding S-pole of the multipolar magnet 14 in the circumferential direction. Furthermore, at this time, the circumferential center of each of the claws 31a of the magnetic yoke 31 coincides with the boundary between the corresponding N-pole and the corresponding S-pole of the multipolar magnet 14 in the circumferential direction.

In this state, the same number of the magnetic lines of force, which flow from each corresponding N-pole to the corresponding S-pole at the multipolar magnet 14, is inputted and outputted at the claws 31a of the magnetic yoke 31 and at the claws 32a of the magnetic yoke 32. Therefore, a closed loop of the magnetic lines of force is generated in the inside of the magnetic yoke 31 and the inside of the magnetic yoke 32. Thereby, the magnetic flux does not leak into the gap between the magnetic yoke 31 and the magnetic yoke 32, so that the density of the magnetic flux, which is sensed with the magnetic sensor 41, becomes zero.

When the steering torque is applied between the input shaft 11 and the output shaft 12 to cause the generation of the torsional displacement (torsional twist) in the torsion bar 13, the relative position between the multipolar magnet 14, which is fixed to the input shaft 11, and the magnetic yokes 31, 32, which are fixed to the output shaft 12, changes in the circumferential direction. Thereby, as shown in FIGS. 3A and 3B or FIGS. 4A and 4B, the circumferential center of each of the claws 31a, 32a is displaced from the boundary between the corresponding N-pole and the corresponding S-pole in the circumferential direction. Therefore, the magnetic lines of force of the opposite polarities are increased in the magnetic yoke 31 and the magnetic yoke 32.

In the position shown in FIG. 3A, the magnetic lines of force of the N-polarity are increased in the magnetic yoke 32, and the magnetic lines of force of the S-polarity are increased in the magnetic yoke 31. Therefore, the density $\phi1$ of the magnetic flux, which passes through the magnetic sensor 41 from the lower side to the upper side in FIG. 3B, is generated upon coupling of the magnetic flux between the magnetic yoke 32 and the main body portion 721 of the lower magnetic flux collecting ring 701 and coupling of the magnetic flux between the main body portion 721 of the upper magnetic flux collecting ring 701 and the magnetic yoke 31.

In the position shown in FIGS. 4A and 4B, the magnetic lines of force of the S-polarity are increased in the magnetic yoke 32, and the magnetic lines of force of the N-polarity are increased in the magnetic yoke 31. Therefore, the density $\phi2$ of the magnetic flux, which passes through the magnetic sensor 41 from the upper side to the lower side in FIG. 4B, is generated.

As discussed above, the density of the magnetic flux, which passes through the magnetic sensor 41, is generally proportional to the amount of the torsional displacement (torsional twist) of the torsion bar 13, and the polarity of the magnetic flux is reversed in response to the direction of the torsion of the torsion bar 13. The magnetic sensor 41 senses the density of this magnetic flux and outputs the sensed density of the magnetic flux as the voltage signal. Thereby, the torque sensor apparatus 3 can sense the steering torque between the input shaft 11 and the output shaft 12.

Next, the advantages of the torque sensor apparatus 3 of the present embodiment will be described in comparison to the comparative example.

Figure 6A:
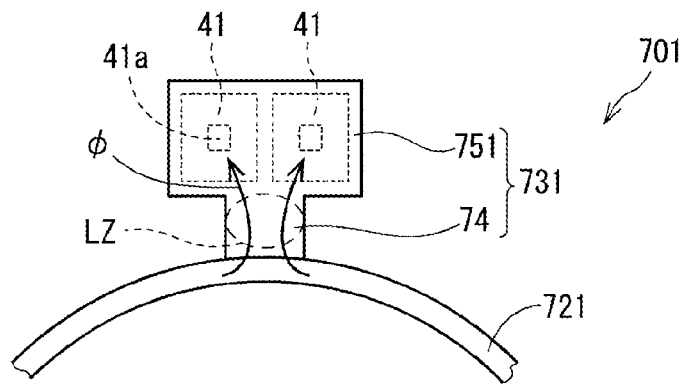
FIG. 6A is a partial schematic view showing a magnetic flux collecting portion of the magnetic flux collecting ring of the first embodiment.
Figure 6B:
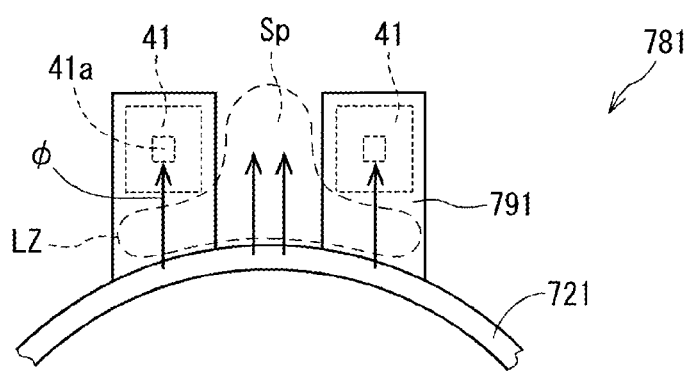
FIG. 6B is a partial schematic view showing magnetic flux collecting portions of a magnetic flux collecting ring of one comparative example.
Figure 6C:
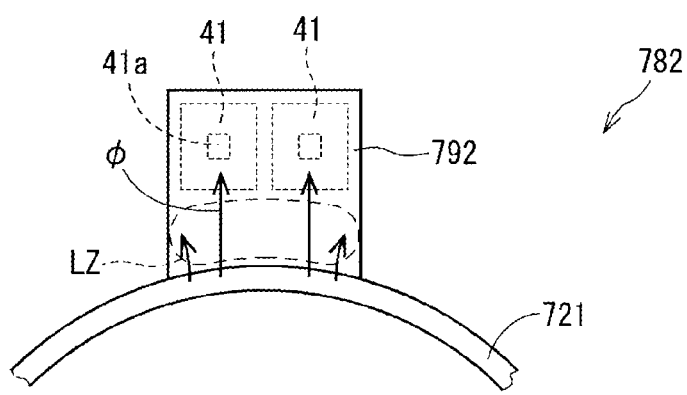
FIG. 6C is a partial schematic view showing a magnetic flux collecting portion of a magnetic flux collecting ring of another comparative example.

(1) A leaked magnetic flux, which is leaked from the magnetic flux collecting portion, will be described for the magnetic flux collecting ring of the present embodiment and magnetic flux collecting rings of comparative examples. Here, FIG. 6A shows the magnetic flux collecting ring of the present embodiment. FIG. 6B shows the magnetic flux collecting ring, which is similar to the magnetic flux collecting ring of JP2007-263871A (US2007/0240521A1). FIG. 6C shows the magnetic flux collecting ring, which is similar to the magnetic flux collecting ring of JP2006-38767A (US2006/0021451A1).

In the magnetic flux collecting ring 781 of the comparative example shown in FIG. 6B, two magnetic flux collecting portions 791 radially outwardly extend from the main body portion 721. The magnetic sensor 41 is installed to each magnetic flux collecting portion 791, and the width (the left-to-right width in FIG. 6B) of each magnetic flux collecting portion 791 is constant. Furthermore, a gap Sp is formed between the magnetic flux collecting portions 791.

With this construction, a portion of the magnetic flux φ, which is collected by the magnetic flux collecting ring 781, is released into the gap Sp to form the leaked magnetic flux, which is not sensed by the magnetic sensor(s) 41. Furthermore, the magnetic flux will also leak from the connecting section between the main body portion 721 and the magnetic sensor 41. A region, from which the magnetic flux leaks, will be referred to as a leaking region LZ and is indicated by a dotted line in FIG. 6B. The magnetic flux, which leaks from the leaking region LZ, is not supplied to the magnetic sensor(s) 41. Therefore, the amount of magnetic flux, which can be effectively sensed with the magnetic sensor(s) 41, is reduced.

In the magnetic flux collecting ring 782 of the comparative example shown in FIG. 6C, a single magnetic flux collecting portion 792, which has a relatively large width in the second direction, radially outwardly extends from a main body portion 721. The two magnetic sensors 41 are placed adjacent to each other on the magnetic flux collecting portion 792, and the width of the magnetic flux collecting portion 792 is generally constant along its projecting length in the first direction.

With this construction, it is possible to reduce the leakage of the magnetic flux into the gap between the magnetic flux collecting portions occurred in the case of FIG. 6B. However, the width of the connecting section, which connects between the main body portion 721 and the magnetic sensors 41, is excessively large in comparison to the width of a passage of the magnetic flux φ. Therefore, the amount of the leaked magnetic flux, which leaks from the connecting section, is increased.

Unlike the comparative examples of FIGS. 6B and 6C, in the magnetic flux collecting ring 701 of FIG. 6A, the width Wc of the connecting section 74 of the magnetic flux collecting portion 731 measured in the second direction is smaller than the width We of the mounting section 751 of the magnetic flux collecting portion 731 measured in the second direction, as discussed above with reference to FIG. 5A. Therefore, the magnetic flux φ is conducted from the main body portion 721 to the magnetic sensor 41 through the connecting section 74, which has the relatively small width.

Thus, the surface area of the leaking region LZ is minimized, and thereby the amount of leaked magnetic flux from the magnetic flux collecting portion 731 can be minimized. Thereby, the magnetic flux, which is collected from the magnetic yokes 31, 32 to the magnetic flux collecting rings 701, can be effectively sensed with the magnetic sensor 41. As a result, the density of the magnetic flux, which is sensed with the magnetic sensor 41, can be increased.

(2) The magnetic flux collecting rings 701 of the present embodiment are configured as follows. Specifically, the connecting section 74 of each of the magnetic flux collecting ring 701 is bent relative to the main body portion 721 such that the axial distance between the mounting sections 751 of the magnetic flux collecting rings 701, which are opposed to each other in the axial direction, is reduced in comparison to that of the main body portions 721. In this way, the magnetoresistance between the mounting sections 751, which are opposed to each other in the axial direction, is reduced, and thereby the sensitivity of the magnetic sensor 41 can be improved.

In the present embodiment, the magnetic sensors 41 are arranged one after another in the second direction on the mounting sections 751. In this way, the distance from the main body portion 721 to the magnetic sensing device 41a of the one of the magnetic sensors 41 and the distance from the main body portion 721 to the magnetic sensing device 41a of the other one of the magnetic sensors 41 can be made generally equal to each other. Thus, it is possible to limit or minimize the variations in the sensed result between the two magnetic sensors 41.

(4) In each magnetic flux collecting ring 701 of the present embodiment, the magnetic flux collecting portion 731 extends from the main body portion 721 in the first direction, i.e., the direction of the normal line of the curve (arcuate curve) of the main body portion 721. Thereby, the magnetic flux collecting ring 701 is formed symmetrically, so that the magnetic flux can be conducted through the magnetic flux collecting ring 701 in good balance.

Next, a modification of the first embodiment as well as second to twelfth embodiments of the present disclosure will be described with reference to FIG. 7A to 12C. In the following modification of the first embodiment and the second to twelfth embodiments, the shape of the magnetic flux collecting portion of each magnetic flux collecting ring, the number of the magnetic sensors, and/or the arrangement of the magnetic sensors will be changed from the first embodiment. In the following discussion, components, which are similar to those of the first embodiment, will be indicated by the same reference numerals and will not be described redundantly.

Modification of First Embodiment

Figure 7A:
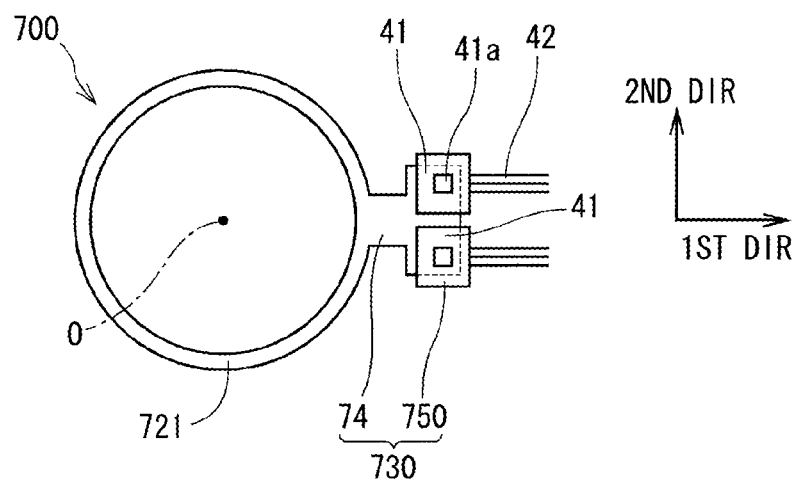
FIG. 7A is a plan view showing a magnetic flux collecting ring according to a modification of the first embodiment.

As shown in FIG. 7A, in the modification of the first embodiment, each of the two magnetic sensors 41 is not entirely placed on the mounting section 750 of the magnetic flux collecting portion 730 of the magnetic flux collecting ring 700. Specifically, a part of an outer peripheral edge area of the magnetic sensor 41 projects outward from an outer peripheral edge of the mounting section 750 of the magnetic flux collecting portion 730. However, the magnetic sensing device 41a of the magnetic sensor 41 is entirely placed within the mounting section 750 of the magnetic flux collecting portion 730. As discussed above, it is only required to entirely place the magnetic sensing device 41a within the mounting section 750. This is also true for each of the following embodiments.

Second Embodiment

Figure 7B:
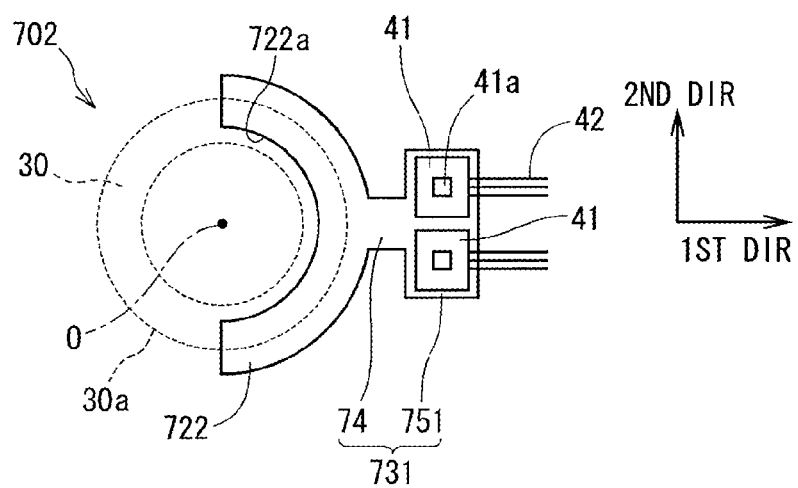
FIG. 7B is a plan view showing a magnetic flux collecting ring according to a second embodiment of the present disclosure.

As shown in FIG. 7B, in each of the magnetic flux collecting rings (also referred to as magnetic flux collecting arcs) 702 of the second embodiment, the main body portion 722 is configured into a semicircular form (a form that is at least partially arcuately curved). The structure of the magnetic flux collecting portion 731 of the second embodiment is substantially the same as that of the first embodiment.

With the above-described construction of the second embodiment, the sensor unit 40 (see FIGS. 3A to 4B), in which the magnetic sensors 41 are installed to the magnetic flux collecting rings 702, can be installed to the torque sensor apparatus 3 in the radial direction. Thereby the assembling of the sensor unit 40 can be eased.

Furthermore, the magnetic flux collecting rings 702 are axially placed between the ring portions of the magnetic yokes 31, 32 of the yoke unit 30 (see FIGS. 3A to 4B) such that an inner peripheral edge 722a of each of the magnetic flux collecting rings 702 is placed radially inward of an outer peripheral edge 30a of the yoke unit 30. Thereby, the main body portion 722 of each magnetic flux collecting ring 702, which is configured into the semicircular form, is axially opposed to the ring portion of the corresponding one of the magnetic yokes 31, 32 such that the magnetic flux is conducted through the corresponding one of the magnetic yokes 31, 32 to the magnetic flux collecting ring 702 through the relatively wide overlapping area therebetween in the axial direction.

Third Embodiment

Figure 8A:
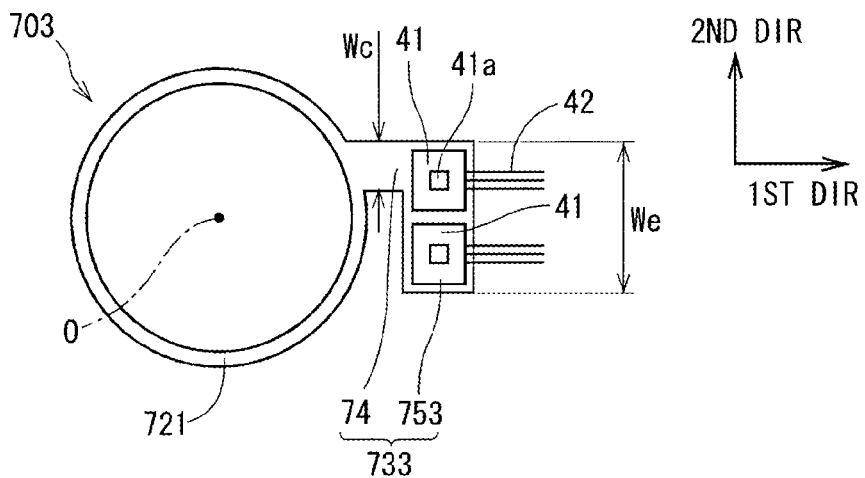
FIG. 8A is a plan view showing a magnetic flux collecting ring according to a third embodiment of the present disclosure.

As shown in FIG. 8A, in each of the magnetic flux collecting rings 703 of the third embodiment, the connecting section 74 of the magnetic flux collecting portion 733 is displaced from the center of the mounting section 753 in the second direction. As in this embodiment, the connecting section 74 and the mounting section 753 need not to be arranged symmetrically about the common axis (common line). Even in the third embodiment, the width Wc of the connecting section 74 measured in the second direction is smaller than the width We of the mounting section 753 measured in the second direction.

Fourth Embodiment

Figure 8B:
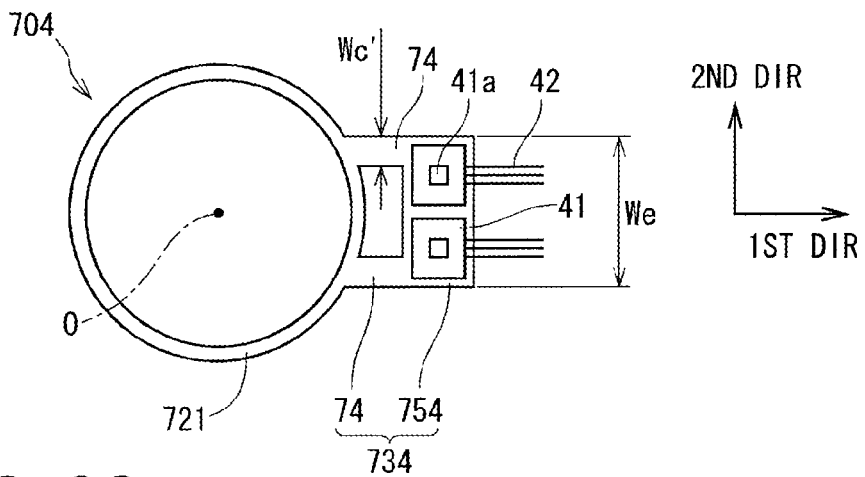
FIG. 8B is a plan view showing a magnetic flux collecting ring according to a fourth embodiment of the present disclosure.

As shown in FIG. 8B, in each of the magnetic flux collecting rings 704 of the fourth embodiment, the connecting section 74 is provided at each of two ends of the mounting section 754, which are opposed to each other in the second direction. Here, it is assumed that the width Wc of the single connecting section 74 of FIG. 8A, which is measured in the second direction in the third embodiment, is two times larger than the width Wc' of each of the two connecting sections 74 of FIG. 8B, which is measured in the second direction in the fourth embodiment. Therefore, in the fourth embodiment, the width Wc' of the respective connecting sections 74 (as well as the sum of the widths Wc' of the two connecting sections 74) measured in the second direction is smaller than the width We of the mounting section 754 measured in the second direction. Thus, similar to the first embodiment, it is possible to reduce the leakage of the magnetic flux from the connecting section 74.

Fifth Embodiment

Figure 8C:
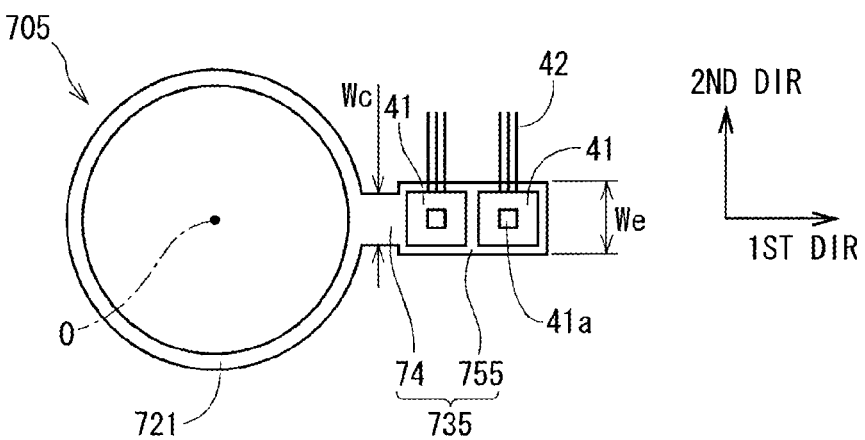
FIG. 8C is a plan view showing a magnetic flux collecting ring according to a fifth embodiment of the present disclosure.

As shown in FIG. 8C, in each of the magnetic flux collecting rings 705 of the fifth embodiment, the two magnetic sensors 41 are arranged one after another in the first direction on the mounting section 755 of the magnetic flux collecting portion 735. Specifically, the magnetic sensing devices 41a of the two magnetic sensors 41 are arranged one after another in the first direction. Even in this embodiment, the width Wc of the connecting section 74 measured in the second direction is smaller than the width We of the mounting section 755 measured in the second direction.

As discussed above, it is not absolutely necessary to arrange the magnetic sensing devices 41a of the magnetic sensors 41 one after another in the second direction, and these magnetic sensing devices 41a may be arranged one after another in any other appropriate direction. Specifically, for example, the magnetic sensing devices 41a may be arranged one after another in a tilted direction that is tilted relative to the first direction, for example, toward the second direction or away from the second direction.

Sixth Embodiment

Figure 9A:
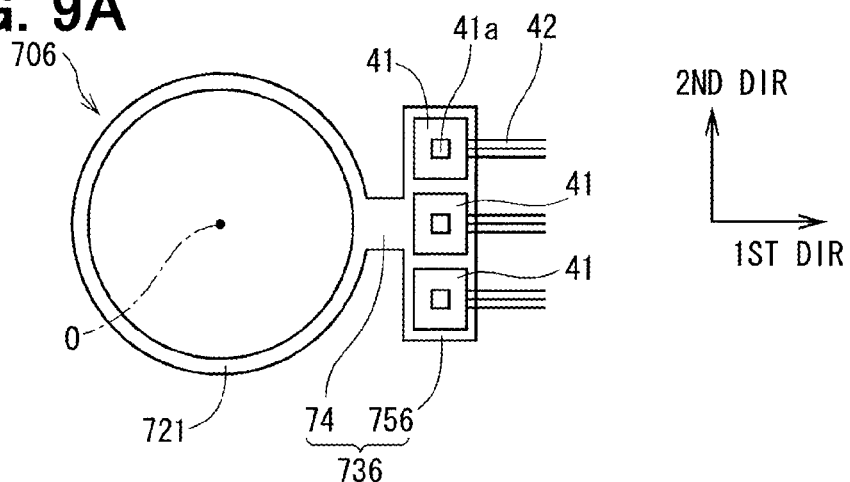
FIG. 9A is a plan view showing a magnetic flux collecting ring according to a sixth embodiment of the present disclosure.

As shown in FIG. 9A, in each of the magnetic flux collecting rings 706 of the sixth embodiment, the number of the magnetic sensors 41 is increased from two to three. These three magnetic sensors 41 are arranged one after another in the second direction on the mounting section 756 of the magnetic flux collecting portion 736.

These three magnetic sensors 41 may be used as follows. Specifically, similar to, for example, the technique of JP2008-232728A, a first one of the magnetic sensors 41 may be used to sense the torque applied to, i.e., exerted between the input and output shafts 11, 12. A second one of the magnetic sensors 41 may be used for the failure determination purpose. A third one of the magnetic sensors 41 may be used as an auxiliary magnetic sensor. In a case where the output of the first one of the magnetic sensors 41, which is used for the torque sensing purpose, is the same as the output of the second one of the magnetic sensors 41, which is used for the failure determination purpose, it is determined that the output of the first one of the magnetic sensors 41, which is used for the torque sensing purpose, is normal. In another case where the output of the first one of the magnetic sensors 41, which is used for the torque sensing purpose, is different from the output of the second one of the magnetic sensors 41, which is used for the failure determination purpose, and the output of the second one of the magnetic sensors 41, which is used for the failure determination purpose, is the same as the output of the third one of the magnetic sensors 41, which is used as the auxiliary sensor, it is determined that the first one of the magnetic sensors 41, which is used for the torque sensing purpose, is failed. Therefore, in such a case, the output of the third one of the magnetic sensors 41, which is used as the auxiliary sensor, is now used in the control operation in place of the first one of the magnetic sensors 41, which is initially used for the torque sensing purpose.

In the sixth embodiment, the three magnetic sensors 41 are symmetrically arranged with respect to the connecting section 74. Therefore, a distance from the main body portion 721 to the first one of the magnetic sensors 41, a distance from the main body portion 721 to the second one of the magnetic sensors 41 and a distance from the main body portion 721 to the third one of the magnetic sensors 41 can be as close as possible to each other, thereby limiting or minimizing the sensing variations among these three magnetic sensors 41.

Seventh Embodiment

Figure 9B:
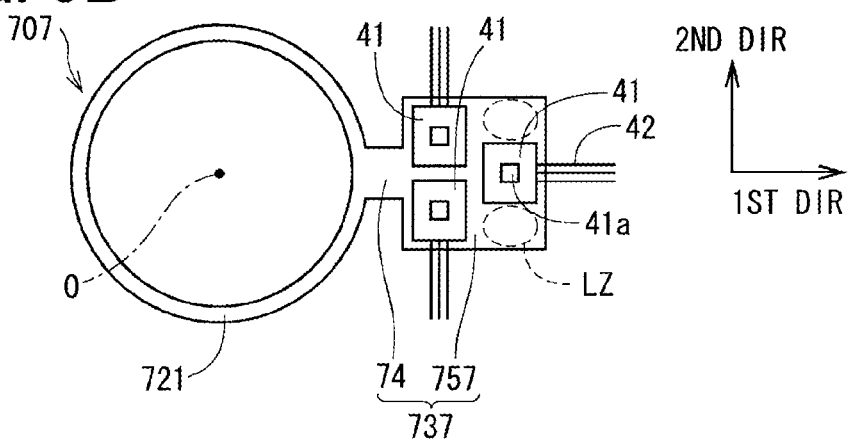
FIG. 9B is a plan view showing a magnetic flux collecting ring according to a seventh embodiment of the present disclosure.

As shown in FIG. 9B, in each of the magnetic flux collecting rings 707 of the seventh embodiment, the three magnetic sensors 41 are installed on the mounting section 757 of the magnetic flux collecting portion 737 such that two of the three magnetic sensors 41 are placed on the connecting section 74 side in the first direction, and the remaining one of the three magnetic sensors 41 is placed on the other side that is opposite from the connecting section 74 in the first direction. The mounting section 757 is configured into a quadrangular form (more specifically, a square form in this embodiment), in which all of the three magnetic sensors 41 can be entirely placed. Empty areas of the mounting section 757, in which none of the three magnetic sensors 41 is installed, form the leaking regions LZ.

Eighth Embodiment

Figure 9C:
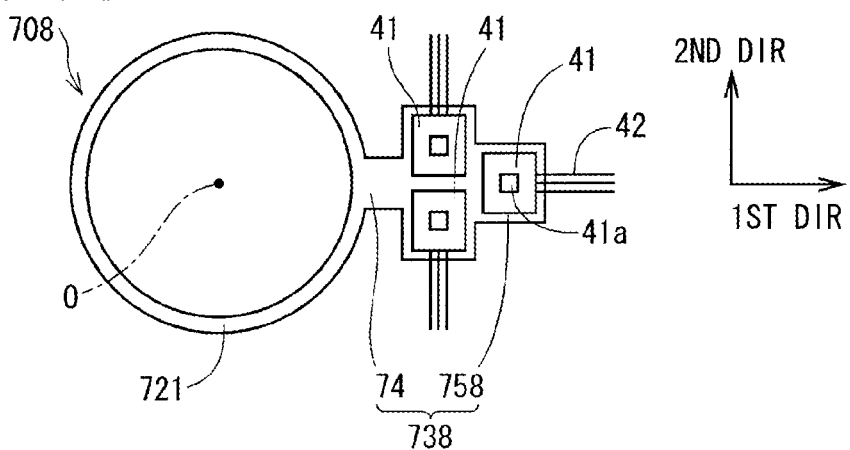
FIG. 9C is a plan view showing a magnetic flux collecting ring according to an eighth embodiment of the present disclosure.

As shown in FIG. 9C, in each of the magnetic flux collecting rings 708 of the eighth embodiment, the three magnetic sensors 41 are installed on the mounting section 758 of the magnetic flux collecting portion 738 such that two of the three magnetic sensors 41 are placed on the connecting section 74 side in the first direction, and the remaining one of the three magnetic sensors 41 is placed on the other side that is opposite from the connecting section 74 in the first direction. The mounting section 758 is configured into a T-form (a step-like form), which extends along the corresponding outer edges of the three magnetic sensors 41. In this way, the leaking regions LZ can be minimized in comparison to the seventh embodiment.

Ninth Embodiment

Figure 10A:
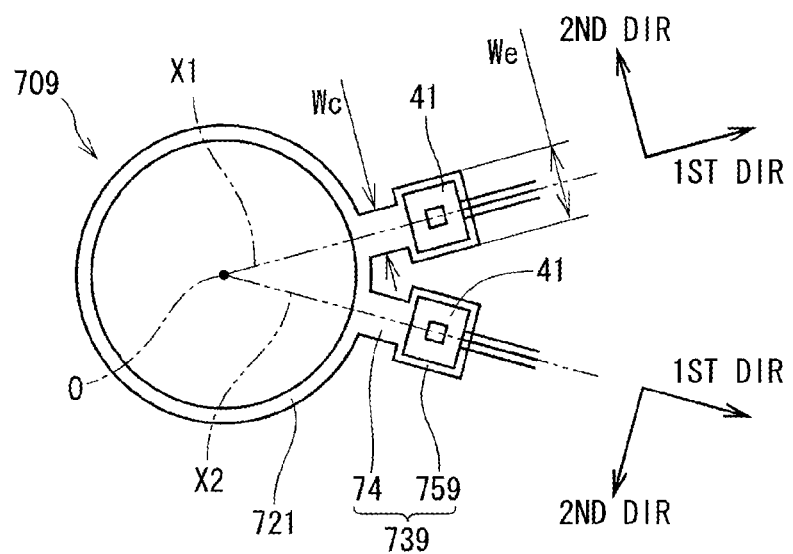
FIG. 10A is a plan view showing a magnetic flux collecting ring according to a ninth embodiment of the present disclosure.

As shown in FIG. 10A, in each of the magnetic flux collecting rings 709 of the ninth embodiment, there are provided two magnetic flux collecting portions 739. The magnetic flux collecting portions 739 radially outwardly project from the main body portion 721. Each of the two magnetic flux collecting portion 739 has the mounting section 759, on which a corresponding one of the two magnetic sensors 41 is installed. The extending direction X1 of one of these two magnetic flux collecting portions 739 is circumferentially displaced from the extending direction X2 of the other one of these two magnetic flux collecting portions 739, and the extending direction (first direction) X1, X2 of each of these two magnetic flux collecting portions 739 is the corresponding radial direction of the rotational axis O, which coincides with the direction of the normal line of the curve (arcuate curve) of the main body portion 721. In each of the magnetic flux collecting portions 739, the width Wc of the connecting section 74, which is measured in the second direction, is smaller than the width We of the mounting section 759, which is measured in the second direction.

Even in this instance where the number of the magnetic sensor(s) 41 installed to each mounting section 759 is one, the magnetic flux leakage can be advantageously reduced or limited like in the other embodiments discussed above.

Tenth Embodiment

Figure 10B:
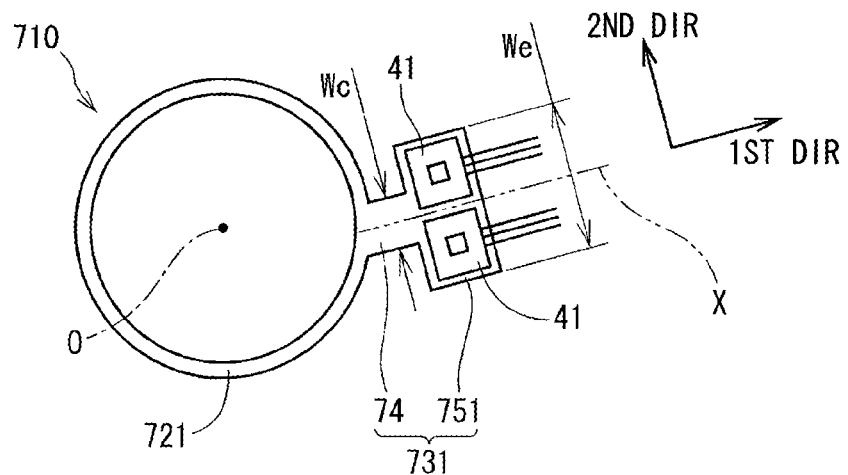
FIG. 10B is a plan view showing a magnetic flux collecting ring according to a tenth embodiment of the present disclosure.

As shown in FIG. 10B, in each of the magnetic flux collecting rings 710 of the tenth embodiment, although the structure of the magnetic flux collecting portion 731 is substantially the same as that of the first embodiment, the direction (first direction) of the extending line X of the magnetic flux collecting portion 731 is deviated from the radial direction of the rotational axis O, which coincides with the direction of the normal line of the curve (arcuate curve) of the main body portion 721. Even in this embodiment, the width Wc of the connecting section 74 measured in the second direction is smaller than the width We of the mounting section 751 measured in the second direction.

Eleventh and Twelfth Embodiments

In each of the two magnetic flux collecting rings 700-710 of each of the first to tenth embodiments as well as the modification of the first embodiment, the magnetic flux collecting portion 730, 731, 733-739 extends from the main body portion 721, 722 in parallel with the imaginary plane V. Thereby, the magnetic flux collecting portions 730, 731, 733-739 of the two magnetic flux collecting rings 700-710 are opposed to each other in the axial direction (see, for example, FIG. 5B). Alternatively, the magnetic flux collecting portions 730, 731, 733-739 may be non-parallel to the imaginary plane V. In other words, each of the magnetic flux collecting portions 730, 731, 733-739 may extend in, for example, an oblique direction or a perpendicular direction relative to the imaginary plane V, so that the magnetic flux collecting portions 730, 731, 733-739 may be opposed to each other in the direction other than the axial direction.

Figure 11A:
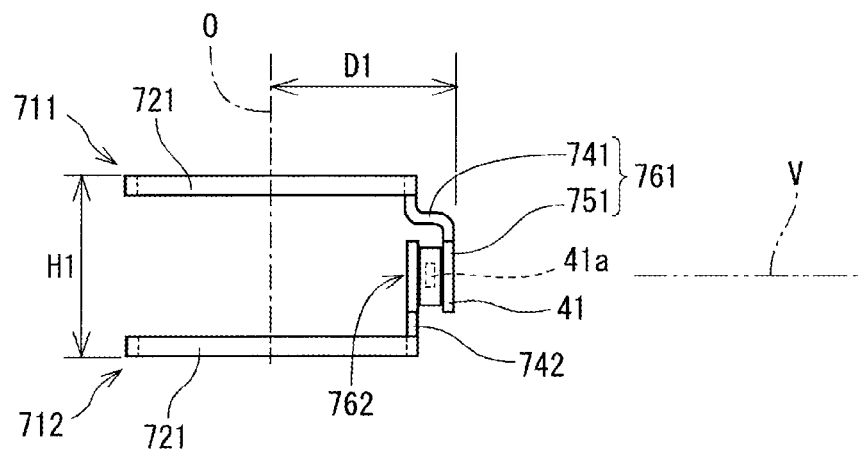
FIG. 11A is a side view showing magnetic flux collecting rings according to an eleventh embodiment of the present disclosure.

For example, in the two magnetic flux collecting rings 711, 712 of the eleventh embodiment shown in FIG. 11A, the magnetic flux collecting portions 761, 762 extend from the main body portions 721, respectively, toward each other in the axial direction. Furthermore, a mounting surface of each magnetic sensor 41 extends in the top-to-bottom direction in FIG. 11A (i.e., the direction parallel to the rotational axis O).

The structure of the mounting section 751 is similar to that of the first embodiment, and the two magnetic sensors 41 are arranged one after another in the second direction. Furthermore, the width of the connecting section 741 measured in the second direction is smaller than the width of the mounting section 751 measured in the second direction.

The magnetic flux collecting portion 761 of the upper magnetic flux collecting ring 711, which is located on the upper side in FIG. 11A, is configured such that the connecting section 741 is bent into a shape of a crank to place the connecting section 741 on the radially outer side of the magnetic sensors 41. The magnetic flux collecting portion 762 of the lower magnetic flux collecting ring 712, which is located on the lower side in FIG. 11A, is configured such that the connecting section 742 linearly extends in the axial direction to place the connecting section 742 on the radially inner side of the magnetic sensors 41. In this way, the magnetic flux collecting portion 761 of the magnetic flux collecting ring 711 and the magnetic flux collecting portion 762 of the magnetic flux collecting ring 712 are opposed to each other in the radial direction, which is perpendicular to the rotational axis O.

Figure 11B:
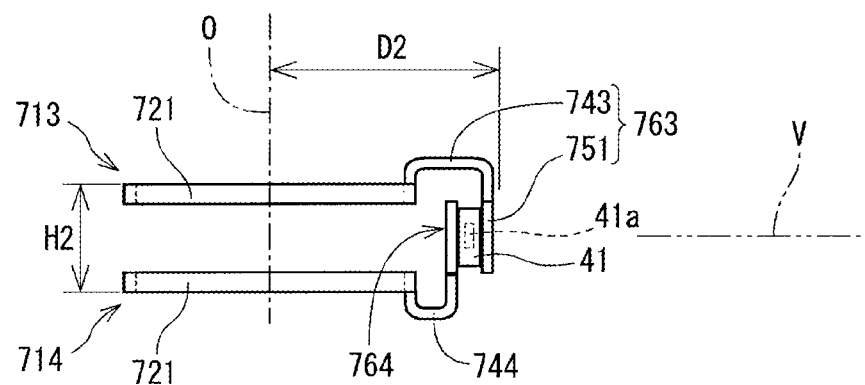
FIG. 11B is a side view showing magnetic flux collecting rings according to a twelfth embodiment of the present disclosure.

Alternatively, in the two magnetic flux collecting rings 713, 714 of the twelfth embodiment shown in FIG. 11B, the magnetic flux collecting portions 763, 764 initially extend from the main body portions 721, respectively, away from each other in the axial direction and are then turned (U-turned) oppositely toward each other in the axial direction. Furthermore, a mounting surface of each magnetic sensor 41 extends in the top-to-bottom direction in FIG. 11B (i.e., the direction parallel to the rotational axis O). The other remaining construction of the torque sensor apparatus, more specifically the magnetic flux collecting rings 713, 714 and the magnetic sensors 41 is the same as that of the eleventh embodiment.

The magnetic flux collecting portion 763 of the upper magnetic flux collecting ring 713, which is located on the upper side in FIG. 11B, is configured such that the connecting section 743 is turned (U-turned) oppositely toward the lower side in the axial direction at a distant location, which is relatively distant from the main body portion 721 in the radial direction, so that the mounting section 751 is placed on the radially outer side of the magnetic sensors 41. The magnetic flux collecting portion 764 of the lower magnetic flux collecting ring 714, which is located on the lower side in FIG. 11B, is configured such that the connecting section 744 is turned (U-turned) oppositely toward the upper side in the axial direction at a close location, which is relatively close to the main body portion 721 in the radial direction, so that the mounting section 751 is placed on the radially inner side of the magnetic sensors 41. In this way, the magnetic flux collecting portion 763 of the magnetic flux collecting ring 713 and the magnetic flux collecting portion 764 of the magnetic flux collecting ring 714 are opposed to each other in the radial direction.

In the eleventh and twelfth embodiments, the lengths of the connecting sections 741, 743, 744, which are other than the connecting section 742, are lengthened, so that the leakage of the magnetic flux may possibly be more easily occur in comparison to the above embodiments. However, in each magnetic flux collecting portion 761-764, the width of the connecting section 741-744 measured in the second direction is smaller than the width of the mounting section 751 measured in the second direction. Therefore, the leakage of the magnetic flux can be limited to the minimum amount.

Furthermore, in the eleventh and twelfth embodiments, the maximum radius (maximum radial size) of the magnetic flux collecting portion 761-764 from the rotational axis O can be reduced in comparison to the first to tenth embodiments. Particularly, in the eleventh embodiment, the maximum radius (maximum radial size) D1 can be minimized. In contrast, in the twelfth embodiment, although the maximum radius (maximum radial size) D2 of the magnetic flux collecting portion 763 is larger than the maximum radius (maximum radial size) D1 of the magnetic flux collecting portion 761 of the eleventh embodiment, the axial distance H2 between the axially outer surfaces of the main body portions 721 of the twelfth embodiment can be reduced in comparison to the axial distance H1 between the axially outer surfaces of the main body portions 721 of the eleventh embodiment. Therefore, it is desirable that an appropriate one of the embodiments is selected according to the available installation space of the torque sensor apparatus, to which the present disclosure is applied. Furthermore, in the eleventh and twelfth embodiments, the distance between the radially opposed inner surfaces of the mounting sections 751 measured in the radial direction is smaller than the distance between the axially opposed inner surfaces of the main body portions 721 measured in the axial direction.

Other Embodiments

Figure 12A:
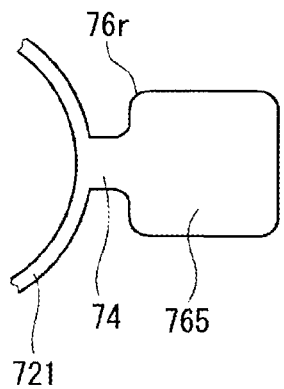
FIGS. 12A to 12C are partial plan views showing mounting sections of magnetic flux collecting rings, respectively, in modifications of the embodiments of the present disclosure.
Figure 12B:
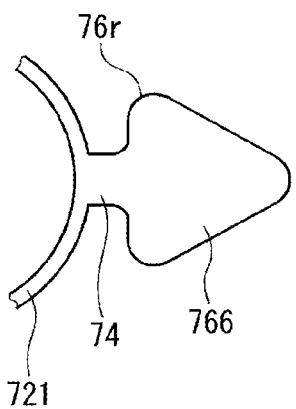
Figure 12C:
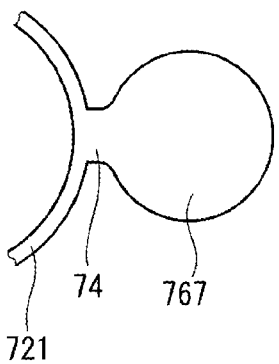

FIGS. 12A to 12C show modifications of the shapes of the mounting sections. The mounting sections of these modifications are configured into polygonal forms having rounded corners (curved corners, i.e., chamfered corners) or are configured into curved forms. Specifically, FIG. 12A shows the mounting section 765, which is planar and is configured into a quadrangular form (polygonal form) having rounded corners 76r. That is, each corner 76r of the mounting section 765 is curved. FIG. 12B shows the mounting section 766, which is planar and is configured into a triangular form having rounded corners 76r. FIG. 12C shows the mounting section 767, which is configured into a circular shape (arcuate shape). That is, the mounting section 767 has a curved outer peripheral edge along an entire circumferential extent of the mounting section 767 except a connection of the mounting section 767 that is connected to, i.e., is joined to the connecting section 74.

The magnetic flux leaks easily at the pointy or acute edged parts but does not easily leak at the curved parts. Therefore, when the mounting sections are modified to have the shapes discussed in these modifications, the amount of leakage of the magnetic flux can be reduced.

In the above embodiments, the multipolar magnet 14 is fixed to the input shaft 11, and the two magnetic yokes 31, 32 are fixed to the output shaft 12. Alternatively, the multipolar magnet 14 may be fixed to the output shaft 12, and the two magnetic yokes 31, 32 may be fixed to the input shaft 11. Further alternatively, the multipolar magnet 14 may be fixed to the one end portion 13a of the torsion bar 13, and the two magnetic yokes 31, 32 may be fixed to the other end portion 13b of the torsion bar 13.

As discussed above, the present disclosure is not limited the above embodiments and modifications thereof. That is, the above embodiments and modifications thereof may be modified in various ways without departing from the spirit and scope of the disclosure. For example, the application of the torque sensor apparatus of the present disclosure is not limited to the electric power steering unit and may be applied to various other apparatuses, which sense the shaft torque.

What is claimed is:

1. A torque sensor apparatus comprising:
   first and second shafts;
   a torsion bar, which has first and second end portions, wherein the first and second end portions are fixed to the first and second shafts, respectively, to coaxially connect between the first and second shafts, and the torsion bar is torsionally deformable when a torque is exerted between the first and second shafts;
   a multipolar magnet that is fixed to one of the first shaft and the first end portion of the torsion bar;
   first and second magnetic yokes that are located on a radially outer side of the multipolar magnet and are fixed to one of the second shaft and the second end portion of the torsion bar, wherein the first and second magnetic yokes are opposed to each other in an axial direction of the torsion bar such that a gap is interposed between the first and second magnetic yokes in the axial direction, and the first and second magnetic yokes form a magnetic circuit in a magnetic field generated from the multipolar magnet;
   first and second magnetic flux collecting bodies, which are formed separately from the first and second magnetic yokes, wherein each of the first and second magnetic flux collecting bodies includes:
      a single main body portion that is placed adjacent to a corresponding one of the first and second magnetic yokes; and
      a magnetic flux collecting portion that radially outwardly projects from the single main body portion and is magnetically coupled with a corresponding one of the first and second magnetic yokes through the single main body portion to conduct a magnetic flux between the corresponding one of the first and second magnetic yokes and the magnetic flux collecting portion; and
   a magnetic sensor that is held between the magnetic flux collecting portions of the first and second magnetic flux collecting bodies and includes a magnetic sensing device, which senses a strength of a magnetic field generated between the magnetic flux collecting portions of the first and second magnetic flux collecting bodies, wherein:
   the magnetic flux collecting portion of each of the first and second magnetic flux collecting bodies includes:
      a mounting section, to which the magnetic sensor is installed; and a connecting section that extends from the single main body portion of a respective one of the first and second magnetic flux collecting bodies in a first direction in an imaginary plane, which is perpendicular to an axis of the torsion bar, to join between the single main body portion and the mounting section;

the connecting section and the mounting section of each of the first and second magnetic flux collecting bodies are configured such that a width of the connecting section, which is measured in a second direction that is perpendicular to the first direction in the imaginary plane, is smaller than a width of the mounting section measured in the second direction; and the single main body portion extends continuously throughout an entire extent of the single main body portion on a radially inner side of the connecting section in each of the first and second magnetic flux collecting bodies.

2. The torque sensor apparatus according to claim 1, wherein the connecting sections of the first and second magnetic flux collecting bodies are bent to place the mounting sections of the first and second magnetic flux collecting bodies such that a distance between the mounting sections of the first and second magnetic flux collecting bodies is smaller than a distance between the single main body portions of the first and second magnetic flux collecting bodies.

3. The torque sensor apparatus according to claim 1, wherein:
the magnetic sensor is one of a plurality of magnetic sensors, which are generally identical to each other; and
the magnetic sensing devices of the plurality of magnetic sensors are arranged one after another in the second direction at a location between the mounting sections of the first and second magnetic flux collecting bodies.

4. The torque sensor apparatus according to claim 1, wherein the mounting section of each of the first and second magnetic flux collecting bodies is generally planar and is configured into one of:
a polygonal form, in which each corner is curved; and
a curved form that has a curved outer peripheral edge along an entire circumferential extent of the curved form except a connection of the curved form that is joined to the connecting section.

5. The torque sensor apparatus according to claim 1, wherein:
at least a part of the single main body portion of each of the first and second magnetic flux collecting bodies is arcuately curved;
the first direction is a direction that is normal to a curve of the single main body portion of each of the first and second magnetic flux collecting bodies; and
the second direction is a direction that is tangent to the curve of the single main body portion of each of the first and second magnetic flux collecting bodies.

6. The torque sensor apparatus according to claim 1, wherein:
the torque sensor apparatus is for an electric power steering unit of a vehicle;
one of the first and second shafts is an input shaft connected to a steering wheel of the vehicle; and
the other one of the first and second shafts is an output shaft connected to drive wheels of the vehicle.

7. The torque sensor apparatus according to claim 1, wherein the single main body portion has an arcuate shape on a radially inner side of the connecting section in each of the first and second magnetic flux collecting bodies.

* * * * *